United States Patent

Nicolas, Jr. et al.

[11] Patent Number: 5,411,662
[45] Date of Patent: May 2, 1995

[54] FLUID SEPARATION ASSEMBLY HAVING AN PURGE CONTROL VALVE

[75] Inventors: Patrick S. Nicolas, Jr., Needham; Benjamin Bikson, Brookline; Salvatore Giglia, Norwood, all of Mass.; David R. Thompson, Grand Island, N.Y.

[73] Assignee: Praxair Technology, Inc., Danbury, Conn.

[21] Appl. No.: 201,529

[22] Filed: Feb. 25, 1994

[51] Int. Cl.6 .............................................. B01D 63/00
[52] U.S. Cl. ........................... 210/321.8; 310/321.78; 310/321.79; 310/321.88; 310/321.89; 310/232; 310/134; 310/137; 310/500.23; 96/10
[58] Field of Search ...................... 210/321.78, 321.79, 210/321.8, 321.88, 321.89, 321.9, 500.23, 117, 134, 136, 137, 232, 323.3; 96/10; 137/533.21

[56] References Cited

U.S. PATENT DOCUMENTS

| | | |
|---|---|---|
| 4,718,921 | 1/1988 | Makino et al. . |
| 4,728,429 | 3/1988 | Cabasso et al. ...................... 210/638 |
| 4,752,305 | 6/1988 | Johnson ............................. 210/321.8 |
| 4,783,201 | 11/1988 | Rice et al. . |
| 4,844,719 | 7/1989 | Toyomoto et al. . |
| 4,846,977 | 7/1989 | DeVellis et al. ...................... 210/640 |
| 4,880,534 | 11/1989 | Burrows ................................. 210/136 |
| 4,961,760 | 10/1990 | Caskey et al. ................... 210/321.81 |
| 5,002,590 | 3/1991 | Frisen et al. . |
| 5,026,479 | 6/1991 | Bikson et al. ...................... 210/321.8 |
| 5,108,464 | 4/1992 | Friesen et al. . |
| 5,160,042 | 11/1992 | Bikson et al. ...................... 210/321.8 |
| 5,192,437 | 3/1993 | Chang et al. ..................... 210/321.89 |
| 5,288,308 | 2/1994 | Duri et al. ................................. 96/10 |

*Primary Examiner*—Robert A. Dawson
*Assistant Examiner*—Ana M. Fortuna
*Attorney, Agent, or Firm*—Chung K. Pak

[57] ABSTRACT

The invention relates to a hollow fiber membrane fluid separation assembly having an integral purge control valve or a purge fluid reflux system, which provides a sweep fluid port internal to the assembly. This assembly is useful for, among other things, separating water vapor from a gas stream.

12 Claims, 3 Drawing Sheets

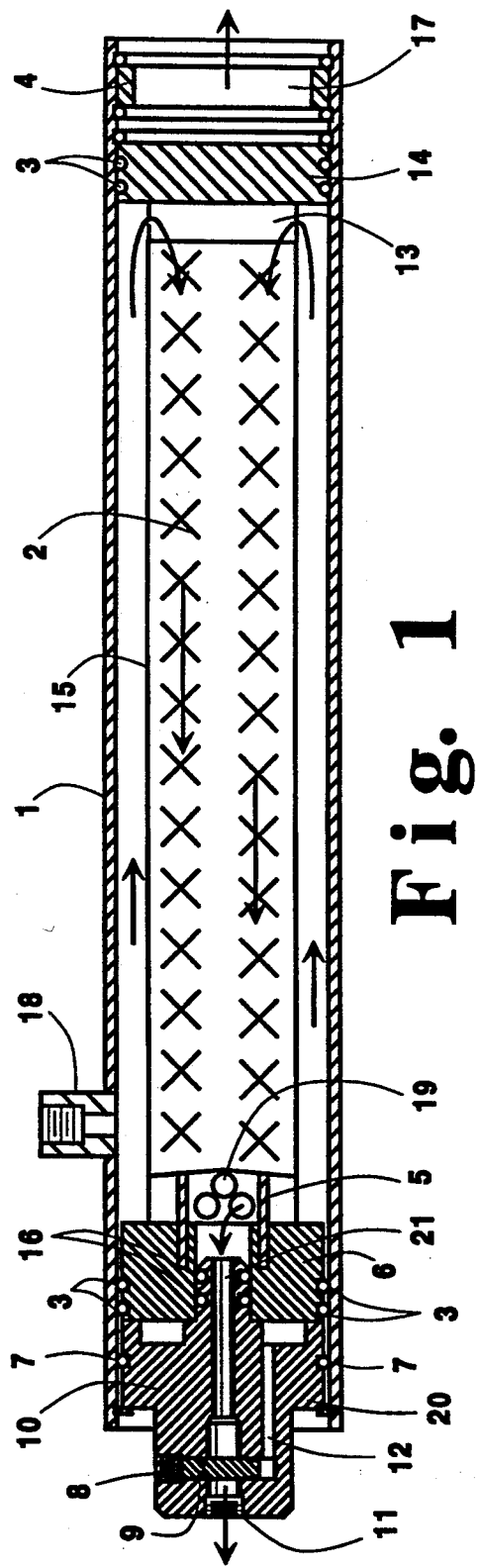
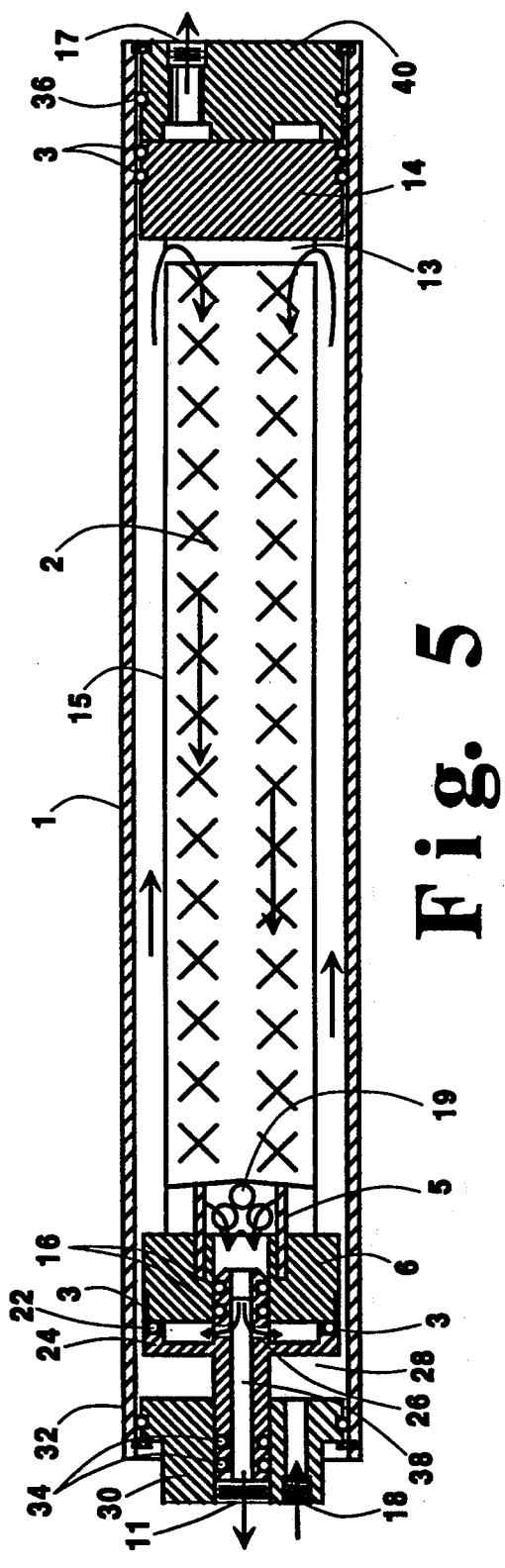

FLUID SEPARATION ASSEMBLY HAVING AN PURGE CONTROL VALVE

FIELD OF THE INVENTION

The invention relates to a hollow fiber membrane fluid separation assembly having an integral purge control valve or a particular purge fluid reflux system, which provides a sweep fluid port internal to the assembly. This assembly is useful for, among other things, separating water vapor from a gas stream.

BACKGROUND OF THE INVENTION

Various hollow fiber membrane fluid separation devices have been used for separating fluid mixtures. Normally, these fluid separation devices are designed so that a fluid mixture can be brought into contact with the hollow fiber membrane therein under pressure for permeation of one or more components of the fluid mixture. Upon contacting, the hollow fiber membrane allows the more readily permeable component of the fluid mixture to permeate into the permeate side of the hollow fiber membrane while retaining a substantial portion of the less readily permeable component of the fluid mixture on the non-permeate side of the hollow fiber membrane. The permeated and non-permeated components are removed through or recovered from at least one permeate outlet and at least one non-permeate outlet, respectively.

In some instances, fluid separation devices are designed to provide a purge or sweep fluid in the permeate side of the hollow fiber membrane. The use of a purge or sweep fluid on the permeate side of the hollow fiber membrane is beneficial in certain gas separation processes, such as gas dehydration processes, where because of high gas permeability coefficient of the permeated component(s), such as water vapor, a high permeate partial pressure builds up on the permeate side of the membrane. Since the high permeate partial pressure of the permeated component will limit the permeation and separation potential of the hollow membrane fibers in the fluid separation device, the introduction of a purge or sweep fluid having low partial pressure into the permeate side reduces the partial pressure of the permeated component, thus allowing the fluid mixture to be more thoroughly stripped of the more readily permeable component.

The fluid separation devices useful for providing a sweep or purge gas generally comprise an annular hollow membrane fiber bundle in a shell having a fluid feed inlet, a non-permeate outlet, a permeate outlet and a sweep or purge gas inlet. U.S. Pat. Nos. 3,499,062, 4,718,921, 5,108,464 and 5,026,479, for example, disclose such fluid separation devices. These fluid separation devices, however, require external plumbing and valves to regulate the flow of the sweep gas to be fed to the sweep or purge gas inlet port. The need to manifold the sweep or purge gas external to the fluid separation devices adds to the size and complexity of the fluid separation devices.

Accordingly, it is an object of the invention to provide means by which the operation of the fluid separation devices can be carried out without external plumbing and valves.

It is another object of the invention to provide means by which the fluid separation devices having a purging means can be easily implemented and operated.

SUMMARY OF THE INVENTION

According to one embodiment of the present invention, the above objectives and other objectives which are apparent to those skilled in the art are achieved by a fluid separation assembly comprising:

(a) an elongated inner core member;

(b) a hollow fiber membrane bundle having permeate and non-permeate sides surrounding a length of said elongated inner core member;

(c) an integral purge control valve having a housing means defining at least one passageway communicating with the non-permeate side of said hollow fiber membrane bundle, said at least one passageway terminating with at least one non-permeate exit port and at least one sweep fluid port with said at least one sweep fluid port capable of passing at least a portion of a non-permeate stream in said at least one passageway to said permeate side of said hollow fiber membrane bundle and a fluid flow controlling means or a fluid flow restrictor for adjusting the flow of a non-permeate stream into said at least one sweep fluid inlet port from said at least one passageway; and (d) a shell containing at least one fluid feed entrance port and at least one permeate exit port surrounding said hollow fiber membrane bundle with at least one end of said shell accommodating said integral purge valve.

According to another embodiment of the present invention, the above objectives and other objectives which are apparent to those skilled in the art are achieved by a fluid separation assembly comprising:

(a) an elongated inner tube;

(b) a hollow fiber membrane bundle having permeate and non-permeate sides at least partially surrounding a length of said elongated inner core member;

(c) at least two tubesheets encapsulating both ends of said hollow fiber, with one end of said elongated inner tube opening out of one of the tubesheets to permit the flow of fluid in and out of the tube;

(d) a reflux system attached to one of said tubesheets, said reflux system having a body surrounding said one of said tubesheets, said body defining at least one passageway communicating with the non-permeate side of said hollow fiber membrane bundle, said at least one passageway terminating with at least one non-permeate exit port, at least one sweep fluid port or chamber in fluid communication with said at least one passageway through at least one orifice, said at least one sweep fluid port or chamber being capable of passing at least a portion of a non-permeate stream in said at least one passageway to said permeate side of said hollow fiber membrane bundle; and (e) a shell surrounding both said hollow fiber membrane bundle and reflux system, with both ends of said shell closed by closing means defining a permeate outlet, fluid feed inlet and/or a non-permeate outlet in fluid communication said at least one passageway.

Tubesheets are provided to encapsulate both ends of said hollow fiber membrane bundle and to separate the feed/non-permeate side from the purge/permeate side of the hollow fiber membrane bundle. At least one of said tubesheets, which is interposed between said at least one sweep fluid port and said permeate side of said hollow fiber membrane bundle, is severed so that the sweep fluid port is in fluid communication with the permeate side of the hollow fiber membrane bundle. Moreover, an essentially non-permeable film barrier may be used to encase essentially the entire longitudinal length of the exposed hollow fibers except for a non-encased circumferential region at one of the ends of the hollow fiber membrane bundle. As used herein the term "a fluid separation assembly" means any device, module or system useful for separating a fluid component or fluid components from a fluid mixture.

As used herein the term "integral purge control valve" means a valve integral with a fluid separation membrane assembly to provide the controlled flow of a sweep gas internal to the assembly.

As used herein the term "exposed hollow fibers" means the entire length of the outer surface of the hollow fiber membrane bundle located between the tubesheets.

As used herein the term "fluid mixture" a mixture of liquids, a mixture of gases or a mixture of gases and liquids.

BRIEF DESCRIPTION OF DRAWINGS

FIG. 1 is a sectional view of a fluid separation device having an integral purge control valve in accordance with one embodiment of the present invention.

FIG. 5 is a sectional view of a fluid separation device having a fixed orifice in accordance with one embodiment of the invention.

DETAILED DESCRIPTION OF THE INVENTION

Figure 2:
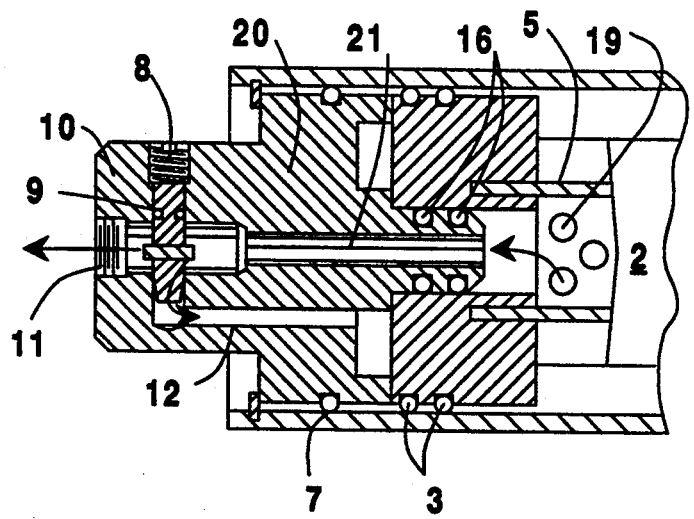
FIG. 2 is a sectional view of a metering type integral purge control valve in accordance with one embodiment of the present invention.

One aspect of the invention lies in providing a purge control valve that is integral with a hollow fiber membrane fluid separation assembly. Another aspect of the invention lies in providing a product reflux system that is integral with a hollow fiber membrane bundle. This valve and reflux system are designed to deliver a particular amount of a sweep or purge fluid to the permeate side of the membrane without external plumbing and valves. Since the sweep or purge gas flows within the fluid separation assembly, the fluid separation assembly can be made to require a fewer external connections. In other words, at least one sweep or purge fluid inlet associated with external plumbing and valves need not be present in the shell of the fluid separation device since the integral purge valve and reflux system allow sweep or purge fluid to be fed to the permeate side of the membrane within the fluid separation assembly.

Preferred fluid separation assemblies having integral purge valves or reflux systems are described in reference to the drawings. However, as can readily be appreciated, the description of preferred embodiments in no way precludes numerous variations of the preferred fluid separation assembly, integral purge control valves and reflux systems, which will become apparent to those skilled in the art.

In FIG. 1, there is illustrated a sectional view of one preferred fluid separation assembly which is used to introduce a fluid mixture onto the shell side, i.e., the exterior surface, of the hollow fiber membrane. The fluid separation assembly comprises a shell (1) having at least one fluid feed inlet (18) and at least one permeate stream outlet (17) surrounding an annular hollow fiber membrane bundle (2) wound on an inner core member (5). Both ends of the hollow fiber membrane bundle (2) are encapsulated in tubesheets (6 and 14) with at least one end of the inner core member opening out of one of the tubesheets (6 or 14). The exposed hollow fiber membrane bundle between the tubesheets (6 and 14) may be encased with an essentially non-permeable film barrier (15) except for a non-encased circumferential region (13) near one of the ends of the hollow fiber membrane bundle (2). One end of the shell (1) has a mechanical support (4) for the annular hollow fiber membrane (2) and possibly at least one opening (17) for removing at least one permeate stream. The opposite end of the shell contains an integral purge control valve (20) defining at least one non-permeate stream outlet (11). The integral purge control valve is designed to introduce a sweep fluid into the bores of the hollow fiber membrane. The integral purge control valve (20) is attached to the shell (1) and/or the tubesheet (6) in a flow tight relationship by, for example, sealing means (7 and 16), such as O-ring seals, threads, mechanical seals, gasketing and/or bonding. At least a portion of the exterior surface of the valve body (10) is preferably designed to be inserted into the shell (1) in a fluid tight relationship while at least a portion of the valve body (10) defining at least one passageway (21) is designed to be inserted into an opening defined by the tubesheet (6) tightly.

At least one passageway (21) communicates with the non-permeate side of said hollow fiber membrane bundle (2) through the interior surface of the inner core member (5). The passageway (21) terminates with at least one non-permeate exit port (11) and at least one sweep fluid port (12). The sweep fluid port (12) is capable of passing at least a portion of a non-permeate stream in the passageway (21) to the permeate side, i.e., the bores, of said hollow fiber membrane bundle (2). The permeate side of the hollow fiber membrane bundle is opened to the sweep fluid port (12) through severing the tubesheet (6). Within the passageway (21), the non-permeate exit port (11) and/or the sweep fluid port (12), any fluid flow controlling means (8) may be placed with sealing means (9) so that the flow of the non-permeate stream from the passageway (21) into said the sweep fluid port (12) can be adjusted or regulated.

Figure 3:
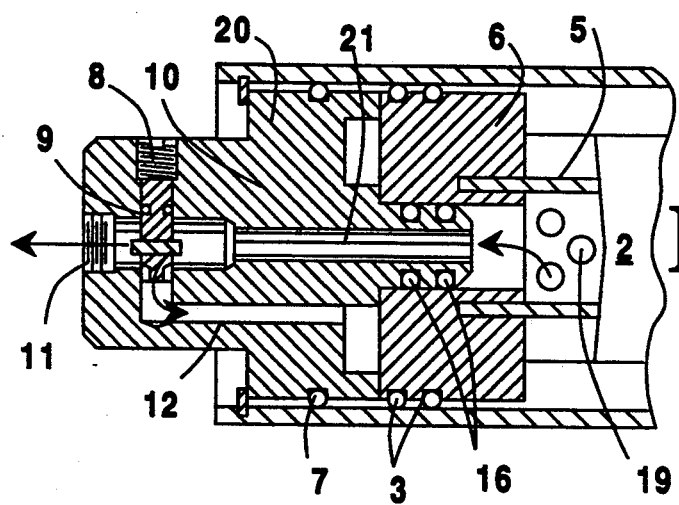
FIG. 3 is a sectional view of an on/off type integral purge control valve in accordance with one embodiment of the present invention.

In FIGS. 2-3, various preferred fluid flow controlling means (8) are illustrated. The fluid flow controlling means (8), as shown in FIGS. 2 and 3, comprises a valve stem vertically extending into the passageway (21) and a portion of said at least one sweep fluid port (12) from the exterior of the valve body (10). At least an end section of the valve stem is placed within the inlet of the sweep fluid port (12). In FIG. 2, at least the end section of the valve stem is gradually narrowed, i.e., gradual taper, so that a gap or a channel is formed between the interior wall surface of the sweep fluid port (12) and the exterior surface of the stem. This gap or channel allows the non-permeate stream in the passageway (21) to flow into the sweep fluid port (12). The gap or channel can be enlarged or shrinked by moving the stem upward or downward away from or into the sweep fluid port (12). In FIG. 3, the valve stem has an end section having a cross-sectional area or a diameter smaller than the inlet of the sweep fluid port (12). The remaining section, particularly a section which is just above the end section, has a cross-sectional area or a diameter greater than the inlet of the sweep fluid port (12). This shape of the stem allows the inlet of the sweep fluid port to be closed or opened by lifting or pushing the stem away from or into the inlet of the sweep port (12). The valve stem of FIGS. 2 and 3 can be made pivotable or rotatable in order to regulate the movement of the stem into and out of the sweep fluid port (12). In addition to the valve stem shown in FIGS. 2 and 3, other type of fluid controlling arrangements may be used to adjust the flow of fluid into the sweep fluid port, such as needle or ball valves.

In lieu of the fluid flow controlling means, for example, the fluid flow restrictor (26), such as an orifice, shown in FIG. 5 may also be used to convey a non-permeate stream in the passageway (22) to the sweep fluid port (12). The orifice or hole, which allows the passageway (21) to communicate with the sweep fluid port (12), is specifically designed to obtain a controlled reflux flow rate, i.e, a controlled non-permeate stream flow into the sweep fluid port (12). The size or diameter of the orifice is dependent on the desired or required specific flow rate as determined by the membrane properties, the desired product (the required dryness of the product), the non-permeate pressure and the permeate pressure. For example, at a 100 psig compressor air discharge pressure, 90° F. gas temperature and atmospheric permeation pressure, a particular membrane fluid separation device will require the passage of a specific amount of a sweep gas into the sweep fluid port (12) to achieve a −40° F. gas dew point. Because the product pressure is much higher than the permeate pressure, the desired size of the orifice can be determined based on critical flow calculations, thus obtaining the desired sweep gas flow.

In FIG. 5, there is illustrated a sectional view of another preferred fluid separation assembly having a product refluxing arrangement attached to a hollow fiber membrane bundle (2). This arrangement allows the fluid separation assembly to operate without an integral purge control valve. This fluid separation assembly comprises a hollow fiber membrane bundle (2) wound on the exterior surface of an elongated inner core number (5) having openings (19). An essentially non-permeable film barrier (15) may be provided to encase essentially the entire longitudinal length of the exposed hollow fiber bundle (2) except for a non-encased circumferenting region (13). Both ends of the hollow fiber membrane bundle (2) are encapsulated in tubesheets (6 and 14), with at least one end of the inner core member (5) opening out of one of the tubesheets, the tubesheet (6). The tubesheets (6 and 14) are severed so that the bores of the hollow fibers are opened. One end of the hollow fiber membrane bundle, a product reflux system (24) is provided. The product reflux system (24) has a body 22) that is attached to one of the tubesheets (6 or 14 in a fluid tight relation ship by sealing means (3) in order to surround one of the tubesheets (6 or 14). The body (22) defines at least one passageway (38) and a sweep fluid port or a chamber (28). While the passageway (38) is in fluid communication with the non-permeate side (the shell side) of the hollow fibers via the inner core member, the sweep fluid port or chamber (28) is in fluid communication with the permeate side (the bores) of the hollow fibers (2). The sweep fluid port or chamber (28) is in fluid communication with the passageway (38) through an orifice (26) located at the inlet of the sweep fluid port or chamber (28). A shell (1) surrounds the hollow fiber membrane bundle (2) including the reflux system (24). The hollow fiber membrane bundle (2) is held within the shell (1) by a mechanical support (4) and a first closing means (30) defining a non-permeate outlet port (11) and a fluid feed inlet (18). The reflux system (24) attached to the tubesheet at one end of the hollow fiber membrane bundle may be attached to the first closing means (30) in a fluid tight relationship by sealing means (39) so that the passageway (38) of the reflux system (24) is in fluid communication with the non-permeate exit (11). On the opposite end of the shell (1), a second closing means (34) defining a permeate outlet (17) is provided. The first and second closing means may be made from any non-permeable materials.

Figure 6:
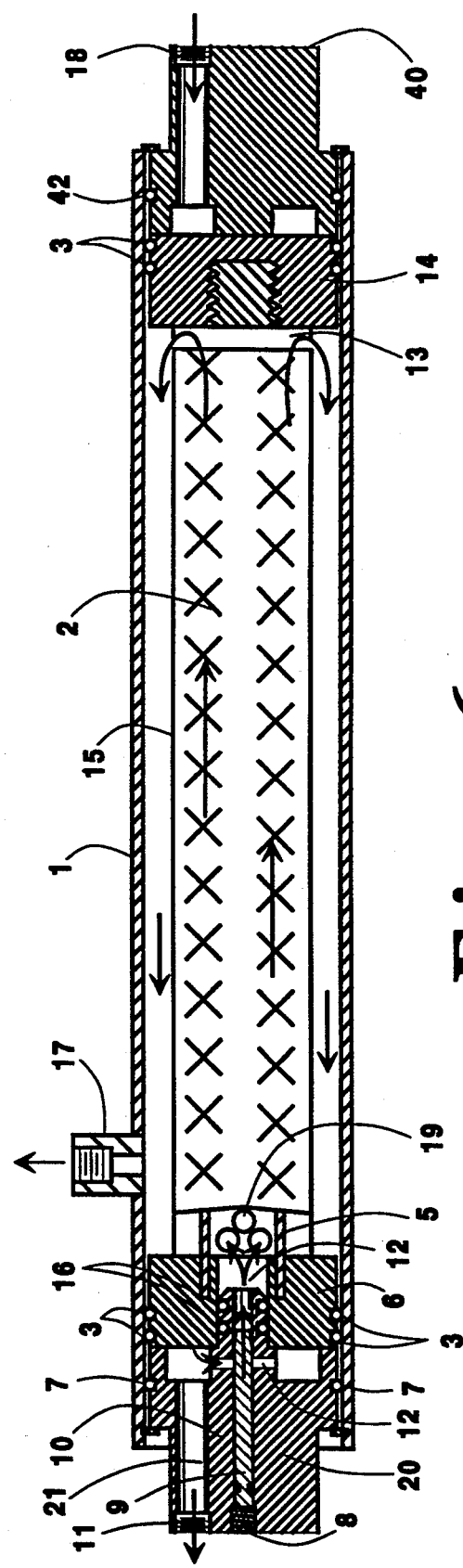
FIG. 6 is a sectional view of a fluid separation device having an integral purge control valve useful for a bore side feed arrangement in accordance with one embodiment of the invention.

In FIG. 6, there is illustrated a sectional view of an additional preferred separation assembly which is used to introduce a fluid mixture into the bores of the hollow fiber membrane. The fluid separation assembly comprises a shell (1) having at least one fluid feed inlet (18) and at least one permeate stream outlet (17) surrounding an annular hollow fiber membrane bundle (2) wound on an inner core member (5) having openings (19). Both ends of the hollow fiber membrane bundle (2) are encapsulated in tubesheets (6 and 14) with at least one end of the inner core member (5) opening out of one of the tubesheets (6 or 14). The exposed hollow fiber membrane bundle between the tubesheets (6 and 14) may be encased with an essentially non-permeable film barrier (15) except for a non-encased circumferential region (13) near one of the ends of the hollow fiber membrane bundle (2). Adjacent to the non-encased circumferential region (13), a shell end closing means (40) defining at least one fluid feed mixture inlet (18). The exterior surface of the shell end closing means (40) is tightly fitted to the shell by sealing means (42), such as O-ring seals, threads, mechanical seals, gasketing and/or bonding. The opposite end of the shell contains an integral purge control valve (20) defining at least one non-permeate stream outlet (11). The integral purge control valve is designed to introduce a sweep fluid into the shell side, i.e, the outer surface, of the hollow fiber membrane. The integral purge control valve (20) is attached to the shell (1) and/or the tubesheet (6) in a flow tight relationship by, for example, sealing means (7 and 16), such as O-ring seals, threads, mechanical seals, gasketing and/or bonding. At least a portion of the exterior surface of the valve body (10) is preferably designed to be inserted into the shell in a fluid tight relationship while at least a portion of the valve body (10) defining at least one sweep fluid port (12) is designed to be inserted into an opening defined by the tubesheet (6) in a fluid tight relationship. The tubesheets (6 and 14) are in turn tightly attached to the interior surface of the shell (1) by sealing means (3).

Figure 4:
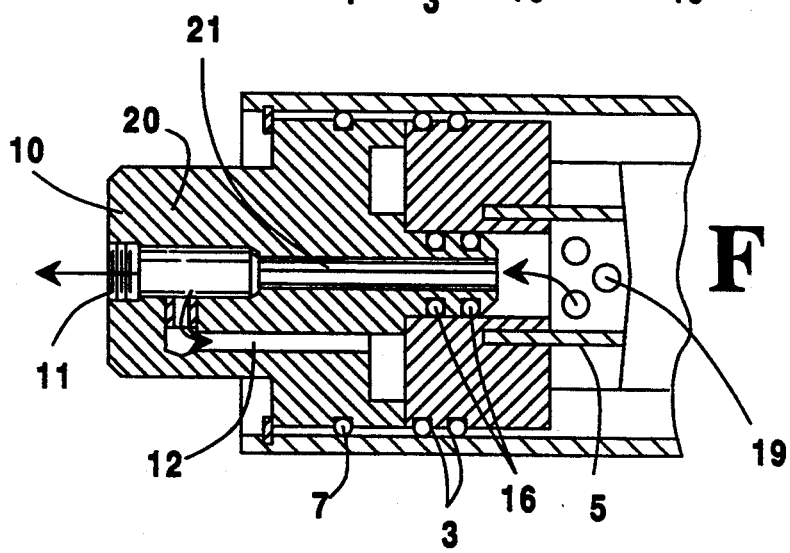
FIG. 4 is a sectional view of a fixed orifice type integral purge control valve in accordance with one embodiment of the present invention.

At least one passageway (21) defined by the valve body (10) communicates with the non-permeate side, i.e., the bores, of the hollow fiber membrane bundle (2). The bores of the hollow fibers are opened to the fluid feed mixture inlet (18) and the passageway (21) by severing the tubesheets (6 and 14). The passageway (21) terminates with at least one non-permeate exit port (11) and at least one sweep fluid port (12). The sweep fluid port (12) is capable of passing at least a portion of a non-permeate stream in the passageway (21) to the permeate side, i.e., the shell side, of said hollow fiber membrane bundle (2) through the inner core member (5). Within the passageway (21), the non-permeate exit port (11) and/or the sweep fluid port (12), any fluid flow controlling means (8) or any fluid restrictor (26), as shown by FIGS. 4 and 5, may be placed so that the flow of the non-permeate stream from the passageway (21) into said the sweep fluid port (12) can be adjusted or regulated. For example, a fluid flow controlling means (8), such as a valve stem, is extended from the exterior of the valve body to the interior section of the sweep fluid port (12) in a longitudinal direction. The valve stem has gradual taper so that a gap or a channel is formed between the interior wall surface of the sweep fluid port (12) and the exterior surface of the stem. This gap or channel allows the flow of the non-permeate stream in the passageway (21) into the sweep fluid port (12).

The annular hollow fiber membrane bundle (2) surrounding an elongated inner core member (5) may be a hollow fiber membrane bundle helically wound around the exterior of the inner core member. The hollow fiber membrane can be wound around the inner core member (5) at any angle, but preferably at an angle of about 30° or higher, as measured from a line parallel to the inner core member. This hollow fiber membrane may be in the form of dense wall, composite or asymmetric membranes. The dense wall, asymmetric and composite membranes are well known in the art, as shown by, e.g., U.S. Pat. Nos. 5,108,464, 4718,921, 4,844,719, 4,497,640, 4,783,201 and 5,026,479 herein incorporated by reference.

In certain instances, however, the hollow fiber membrane in the form of a composite membrane is preferred. To produce this composite hollow fiber membrane, permeable or porous hollow fiber is initially produced through any known methods, e.g., as described by I. Cabasso, "Hollow Fiber Membranes", Kirk-Othmer: Enc. of Chem. Tech., 12, Third Ed., pp 492-517 (1980) and I. Cabasso, "Membranes", Enc. of POl. Sc. & Eng., 9, Second Ed., pp 509-579 (1987). The permeable or porous hollow fiber may be produced from any known inorganic and/or organic materials including those provided in U.S. Pat. No. 5,026,479. The desired wall thickness, average pore cross-sectional diameter and outside diameter of the resulting hollow fiber are normally dependent on the intended use of the membrane. Once the desired porous hollow fiber is formed, a thin membrane forming material described is provided on the surface of the hollow fiber. This can be accomplished by any known procedures including that shown in U.S. Pat. No. 4,4467,001, e.g., applying a solution of the membrane forming material on the surface of the hollow fiber to deposit a finished dry coating.

The inner core member (5) employed may be an elongated tube having openings near at least one of the ends to permit the flow of fluid between the exterior surface of the hollow fibers and the interior core of the tube. The size, number and location of these openings are dependent upon the size of the assembly, fluid flow velocity on the non-permeate side and fluid flow configurations, e.g., countercurrent, cocurrent and cross flow. In a countercurrent flow arrangement, for instance, the openings are generally situated at the point from about one percent or less to a point up to about 25 percent of the longitudinal length between the two tubesheets. On the other hand, in a cross flow arrangement, the openings are generally situated throughout the entire longitudinal length of the inner core member. The openings can be in the form of drilled holes, cut slots or other perforations. The cross-sectional area occupied by the holes is essentially determined by pressure drop requirements and preferably kept to acceptable minimum cross-section and holes positioned adjacent to the tubesheet to insure optimum flow dynamics. The tube can be made from any nonpermeable material, metal, glass, wood, plastic, composite laminate and the like.

Adjacent to the openings, at least one tubesheet, as shown by FIGS. 1, 5 and 6, may be provided to encapsulate one of the ends of the hollow fiber membrane bundle (2). An additional tubesheet is provided to the other end so that both ends of the hollow fiber membrane bundle (2) are encapsulated in tubesheets, with at least one end of the inner core member, e.g., the tube, opening out of one of the tubesheets, e.g., the tubesheet (6), to permit the flow of fluid in and out of the tube. The tubesheet encapsulating both ends of the bundle (2) is tightly coupled to the shell (1) by O-ring seals (3). At least one of the tubesheets, e.g., tubesheet (6), preferably both the tubesheets, are severed so that bores of the hollow fibers are opened. The tubesheets can be made from any nonpermeable materials, such as epoxy resin.

The entire longitudinal length of the exposed hollow fibers between the tubesheets, except for a circumferential region proximate to one of the tubesheets, e.g., the tubesheet (14), may be tightly encased in an essentially non-permeable, preferably flexible, barrier comprised of one or more layers of thin film. The essentially nonpermeable flexible film wrap or film barrier can be of any composition, for example, a thin film of a polyolefine or polyvinylidene chloride. The impervious film can be, further, an impervious coating material applied from innocuous solvent. Alternatively the impervious barrier can be placed by shrinking a plastic shrink sleeve around the exterior surface of the bundle. It can be applied before the tubesheet is formed with one end embedded in the tubesheet, if desired, or it can be applied to the bundle of hollow fibers after the tubesheet has been formed. As indicated the flexible film wrap does not cover the entire surface of the bundle of hollow fibers. The end that is opposite to the end in which the holes are present in the center core tube a portion of the bundle of hollow fibers near the opposite tubesheet is left uncovered to provide for gas entrance or exit of fluids. This uncovered gap can be of variable width but generally is from about one percent or lower to up to about 25 percent of the longitudinal length between the two tubesheets, preferably from about one to five percent. For optimal flow dynamic performance, the gap should be kept to minimum dimensions, the dimensions further determined by minimum pressure drop requirements since an excessively narrow gap can induce severe pressure drop.

The shell surrounding the entire longitudinal length of the hollow fiber membrane bundle wound on the inner core member can be cylindrical or any other geometric shape and may be capable of withstanding high pressure and/or high or low temperature. The shell may extend beyond the entire longitudinal length of the hollow fiber membrane bundle to accommodate the tubesheets and possibly an integral purge control valve (depending on whether the integral valve or the shell is fitted into the shell or the integral valve) and the shell closing means (depending on whether the closing means is fitted into the shell or the shell is fitted into the closing means).

In practice of the fluid separation assembly of FIG. 1, the fluid stream is fed to the assembly via the inlet (18). The film barrier (15) forces the fluid to travel along the length of the bundle unit until it reaches the open area (13). The fluid is prevented from exiting the ends of the membrane device by the O-ring seals (3) on the tubesheets (6) and (14). The non-permeating fluid continues through the uncovered portion (13) and down through extraction holes (19) while the readily permeable component of the fluid permeates onto the bores, the permeate side, of the hollow fibers. The non-permeating fluid then leaves through port (11) via an opening in the tubesheet (6) and at least one passageway (21) of valve body (10). The non-permeating fluid is prevented from directly entering the open bore side of the tubesheet (6) by O-ring seals (16). By adjusting valve stem (8), a portion of the non-permeating fluid in at least one passageway (21) of valve body (10) travels through at least one sweep fluid port (12) and into the bores of the hollow fibers. The sweep fluid port being sealed by O-rings (7) and (16) travels along the bores of the hollow fibers and exits port (17) with the permeated component.

In practice of the fluid separation assembly of FIG. 5, the fluid stream is fed to the assembly via the inlet (18). The film barrier (15) forces the fluid to travel along the length of the bundle unit until it reaches the open area (13). The fluid is prevented from exiting the ends of the membrane device by the O-ring seals (3) on the tubesheets (6) and (14). As the fluid continues through the uncovered portion (13) and down through extraction holes (19), the more readily permeable component of the fluid permeates to the bores, the permeate side, of the hollow fibers. The non-permeating fluid then leaves through a non-permeate outlet port (11) via an opening in the tubesheet (6) and at least one passageway (38) of the reflux system (24). The non-permeating fluid is prevented from directly entering the open bore side of the tubesheet (6) by O-ring seals (16). Through a specifically sized orifice (26), a portion of the non-permeating fluid in at least one passageway (38) is delivered into the bores of the hollow fibers via sweep fluid port or chamber (28) which is in communication with the open ends of the hollow fibers in tubesheet (6). The sweep gas being sealed by O-rings (3) and (16) travels along the bores of the hollow fibers and exits port (17) with the permeated component.

In practice of the fluid separation assembly of FIG. 6, the fluid stream is fed to the bores of the hollow fibers via the inlet (18). The fluid to travel along the length of the bundle unit (2) until it reaches at least one passageway (21) of an integral purge control valve (20). The non-permeating fluid is prevented from directly entering the open shell side, the permeate side, of the tubesheets (6 and 14) by O-ring seals (3 and 16). The non-permeating fluid then leaves through a non-permeate outlet port (11) via at least one passageway (21) of the integral purge control valve (20). By adjusting valve stem (8), a portion of the non-permeating fluid in the passageway (21) of the integral purge control valve (20) travels into the shell side, the permeate side, of the hollow fibers through a sweep fluid port (12) and openings in the inner core member (5). The sweep fluid port (12) flowing out of the openings in the inner core member (5) is forced to travel along the length of the fiber bundle (2) due to a film barrier (15) encasing the exposed surface of the hollow fiber membrane bundle (2). The sweep fluid and the permeated component exit through at an open area (13) of the hollow fiber membrane bundle (2) and a permeate port (17).

Although this invention has been described in detail with reference to certain embodiments, those skilled in the art will recognize that there are other embodiments of the invention within the spirit and scope of the claims.

What is claimed is:

1. A fluid separation assembly comprising:
   (a) an elongated inner core member;
   (b) a hollow fiber membrane bundle having permeate and non-permeate sides at least partially surrounding a length of said elongated inner core member;
   (c) an integral purge control valve having a valve body defining at least one passageway communicating with the non-permeate side of said hollow fiber membrane bundle with one end of said at least one passageway terminating with at least one non-permeate exit port and defining at least one sweep fluid port communicating with said at least one passageway and said permeate side of said hollow fiber membrane bundle so that said at least one sweep fluid port is capable of passing at least a portion of a non-permeate stream in said at least one passageway to said permeate side of said hollow fiber membrane bundle, and a fluid flow controlling means for adjusting or specifying the flow of a non-permeate stream into said at least one sweep fluid port from said at least one passageway; and
   (d) a shell containing at least one fluid feed entrance port and at least one permeate exit port surrounding said hollow fiber membrane with at least one end of said shell accommodating said integral purge control valve, wherein said non-permeate side is outside of the hollow fiber membrane and said permeate side is inside of the hollow fiber membrane.

2. The fluid separation device according to claim 1, wherein said fluid flow controlling means comprises a valve stem extending into said at least a portion of said at least one sweep gas port from an exterior of the valve body, said valve stem having gradual taper, thus forming at least one channel between an exterior body of the valve stem and an interior surface of said at least one sweep fluid port.

3. The fluid separation device according to claim 1, wherein said elongated inner core member comprises a center core tube having perforated holes in the wall thereof at a location close to said integral valve, said perforated holes providing fluid communication between the exterior surface of said hollow fiber membrane bundle and the interior of said center core tube.

4. The fluid separation device according to claim 3, further comprising an essentially non-permeable film barrier encasing essentially the entire longitudinal length of said hollow fiber membrane bundle except for a non-encased circumferential region at one end of the hollow fiber membrane bundle.

5. The fluid separation device according to claim 4, further comprising tubesheets capable of passing a fluid stream therethrough encapsulating both ends of said hollow fiber membrane bundle, with at least one of said tubesheets interposed between said at least one sweep fluid port and said permeate side of said hollow fiber membrane bundle.

6. The fluid separation device according to claim 5, further comprising seals located between the exterior surface of the housing means of the integral valve and the interior surface of the shell.

7. A fluid separation assembly comprising:
(a) an elongated inner tube;
(b) a hollow fiber membrane bundle having permeate and non-permeate sides at least partially surrounding a length of said elongated inner core member;
(c) at least two tubesheets encapsulating both ends of said hollow fiber, with one end of said elongated inner tube opening out of one of the tubesheets to permit the flow of fluid in and out of the tube;
(d) a reflux system attached to one of said tubesheets, said reflux system having a body surrounding said one of said tubesheets, said body defining at least one passageway communicating with the non-permeate side of said hollow fiber membrane bundle with one end of said at least one passageway terminating with at least one non-permeate exit port and defining at least one sweep fluid port or chamber in fluid communication with said at least one passageway through at least one orifice and in fluid communication with said permeate side of said hollow fiber membrane bundle so that said at least one sweep fluid port or chamber is capable of passing at least a portion of a non-permeate stream in said at least one passageway to said permeate side of said hollow fiber membrane bundle; and
(e) a shell surrounding both said hollow fiber membrane bundle and reflux system, with both ends of said shell closed by closing means defining a permeate outlet, fluid feed inlet and/or a non-permeate outlet in fluid communication said at least one passageway, wherein said non-permeate side is outside of the hollow fiber membrane and said permeate side is inside of the hollow fiber membrane.

8. A fluid separation assembly comprising:
(a) an elongated inner core member;
(b) a hollow fiber membrane bundle having permeate and non-permeate sides at least partially surrounding a length of said elongated inner core member;
(c) an integral purge control valve having a valve body defining at least one passageway communicating with the non-permeate side of said hollow fiber membrane bundle with one end of said at least one passageway terminating with at least one non-permeate exit port and defining at least one sweep fluid port communicating with said at least one passageway and said permeate side of said hollow fiber membrane bundle so that said at least one sweep fluid port is capable of passing at least a portion of a non-permeate stream in said at least one passageway to said permeate side of said hollow fiber membrane bundle, and a fluid flow restrictor for passing a particular amount of a non-permeate stream into said at least one sweep fluid port from said at least one passageway; and
(d) a shell containing at least one fluid feed entrance port and at least one permeate exit port surrounding said hollow fiber membrane with at least one end of said shell accommodating said integral purge control valve, wherein said non-permeate side is outside of the hollow fiber membrane and said permeate side is inside of he hollow fiber membrane.

9. The fluid separation assembly according to claim 8, wherein said fluid flow restrictor is an orifice at the inlet of said at least one sweep fluid port.

10. A fluid separation assembly comprising:
(a) an elongated inner core member;
(b) a hollow fiber membrane bundle having permeate and non-permeate sides at least partially surrounding a length of said elongated inner core member;
(c) an integral purge control valve having a valve body defining at least one passageway communicating with the non-permeate side of said hollow fiber membrane bundle with one end of said at least one passageway terminating with at least one non-permeate exit port and defining at least one sweep fluid port communicating with said at least one passageway and said permeate side of said hollow fiber membrane bundle so that said at least one sweep fluid port is capable of passing at least a portion of a non-permeate stream in said at least one passageway to said permeate side of said hollow fiber membrane bundle, and a fluid flow controlling means for adjusting or specifying the flow of a non-permeate stream into said at least one sweep fluid port from said at least one passageway; and
(d) a shell containing at least one fluid feed entrance port and at least one permeate exit port surrounding said hollow fiber membrane with at least one end of said shell accommodating said integral purge control valve, wherein said non-permeate side is inside of the hollow fiber membrane and said permeate side is outside of the hollow fiber membrane.

11. A fluid separation assembly comprising:
(a) an elongated inner tube;
(b) a hollow fiber membrane bundle having permeate and non-permeate sides at least partially surrounding a length of said elongated inner core member;
(c) at least two tubesheets encapsulating both ends of said hollow fiber, with one end of said elongated inner tube opening out of one of the tubesheets to permit the flow of fluid in and out of the tube;
(d) a reflux system attached to one of said tubesheets, said reflux system having a body surrounding said one of said tubesheets, said body defining at least one passageway communicating with the non-permeate side of said hollow fiber membrane bundle with one end of said at least one passageway terminating with at least one non-permeate exit port and defining at least one sweep fluid port or chamber in fluid communication with said at least one passageway through at least one orifice and in fluid communication with said permeate side of said hollow fiber membrane bundle so that said at least one sweep fluid port or chamber is capable of passing at least a portion of a non-permeate stream in said at least one passageway to said permeate side of said hollow fiber membrane bundle; and
(e) a shell surrounding both said hollow fiber membrane bundle and reflux system, with both ends of said shell closed by closing means defining a permeate outlet, fluid feed inlet and/or a non-permeate outlet in fluid communication said at least one passageway, wherein said non-permeate side is inside of the hollow fiber membrane and said permeate side is outside of the hollow fiber membrane.

12. A fluid separation assembly comprising:
(a) an elongated inner core member;

(b) a hollow fiber membrane bundle having permeate and non-permeate sides at least partially surrounding a length of said elongated inner core member;

(c) an integral purge control valve having a valve body defining at least one passageway communicating with the non-permeate side of said hollow fiber membrane bundle with one end of said at least one passageway terminating with at least one non-permeate exit port and defining at least one sweep fluid port communicating with said at least one passageway and said permeate side of said hollow fiber membrane bundle so that said at least one sweep fluid port is capable of passing at least a portion of a non-permeate stream in said at least one passageway to said permeate side of said hollow fiber membrane bundle, and a fluid flow restrictor for passing a particular amount of a non-permeate stream into said at least one sweep fluid port from said at least one passageway; and (d) a shell containing at least one fluid feed entrance port and at least one permeate exit port surrounding said hollow fiber membrane with at least one end of said shell accommodating said integral purge control valve, wherein said non-permeate side is inside of the hollow fiber membrane and said permeate side is outside of the hollow fiber membrane.

* * * * *